March 1, 1966 J. O. CLAUDEL 3,237,205
EDUCATIONAL DEVICE AND TOY
Filed Sept. 20, 1963 4 Sheets-Sheet 2

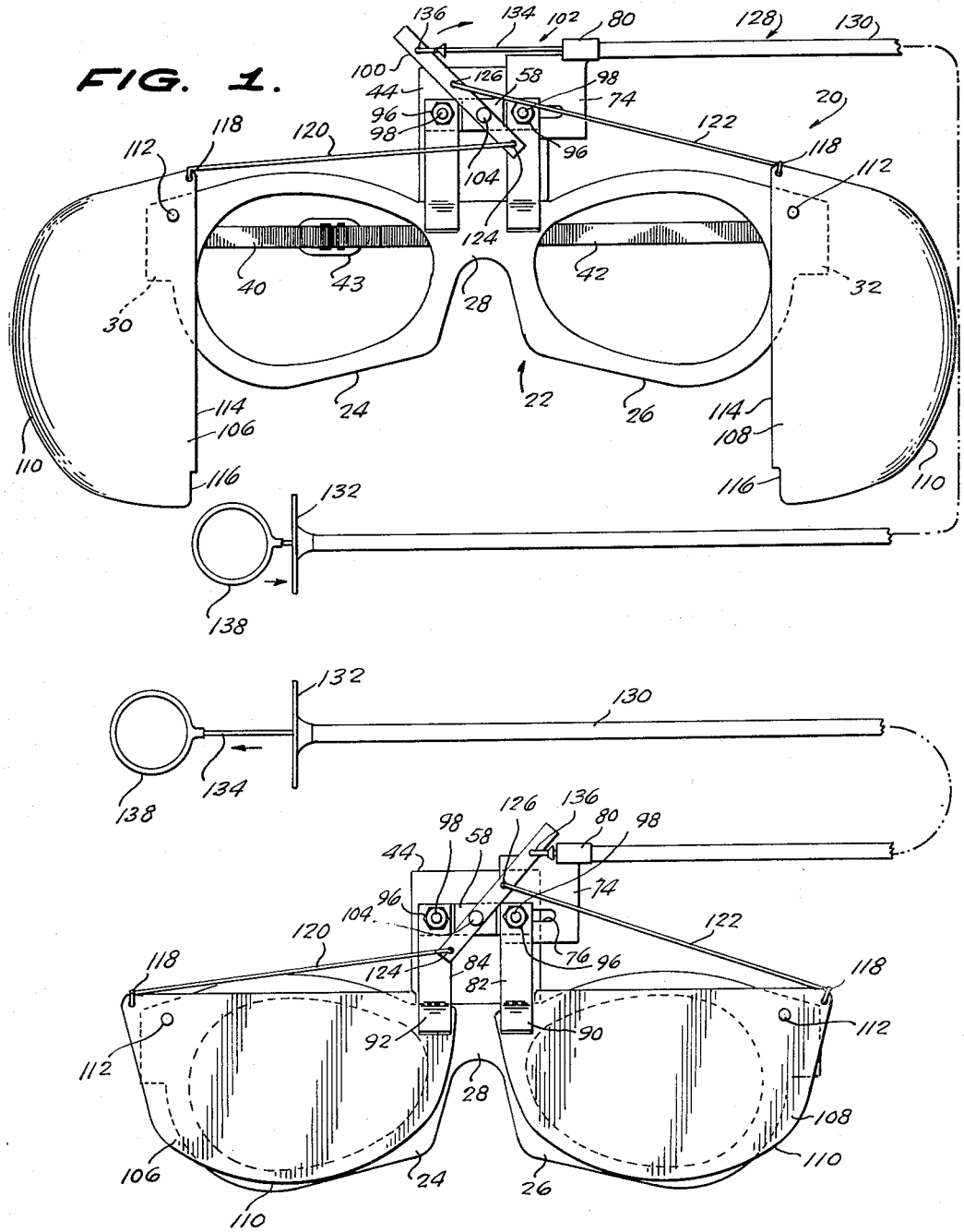

INVENTOR.
JUNOR O. CLAUDEL,
BY
McMorrow, Berman & Davidson
ATTORNEYS.

March 1, 1966 J. O. CLAUDEL 3,237,205
EDUCATIONAL DEVICE AND TOY
Filed Sept. 20, 1963 4 Sheets-Sheet 3

INVENTOR.
JUNOR O. CLAUDEL,
BY
McMorrow, Berman & Davidson
ATTORNEYS.

March 1, 1966 J. O. CLAUDEL 3,237,205
EDUCATIONAL DEVICE AND TOY
Filed Sept. 20, 1963 4 Sheets-Sheet 4
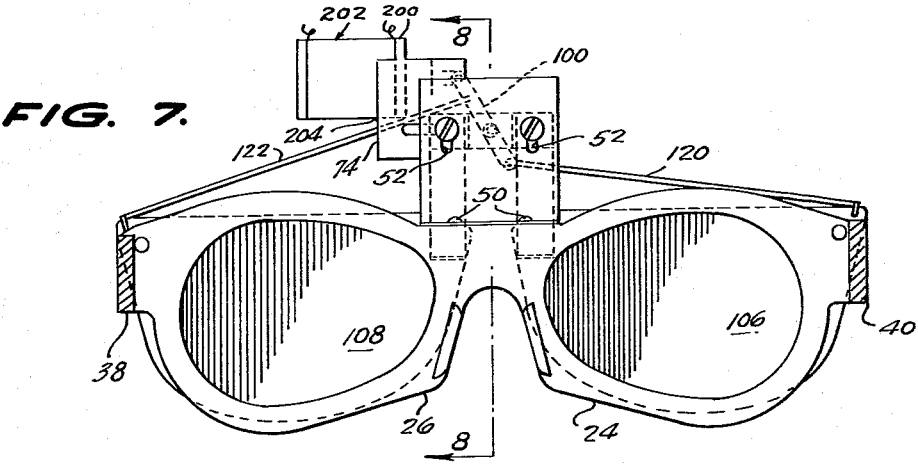
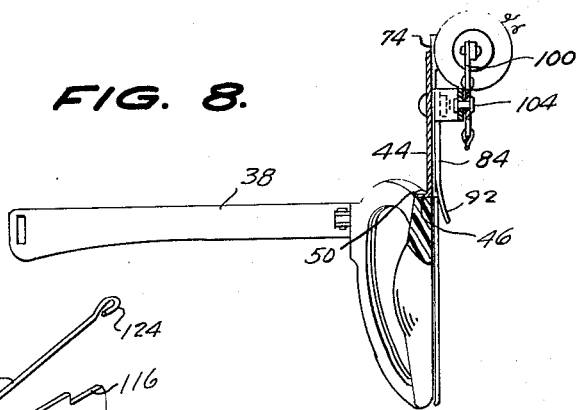
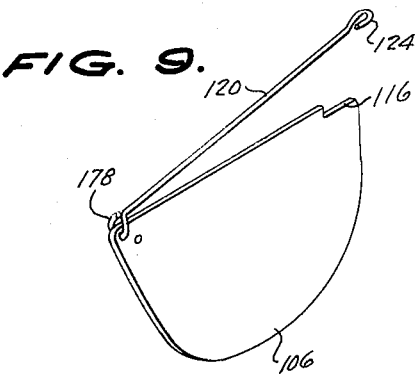
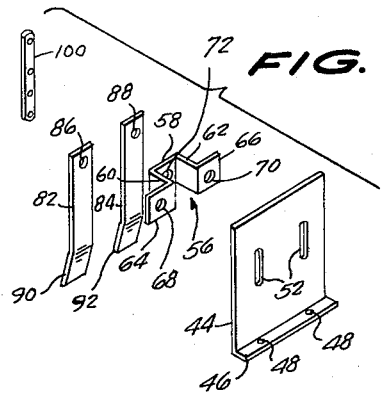
INVENTOR.
JUNOR O. CLAUDEL,
BY
McMorrow, Berman + Davidson
ATTORNEYS.

United States Patent Office 3,237,205
Patented Mar. 1, 1966

1

3,237,205
EDUCATIONAL DEVICE AND TOY
Junor O. Claudel, Rte. 2, Box 212, Baker, La.
Filed Sept. 20, 1963, Ser. No. 310,298
8 Claims. (Cl. 2—15)

This invention relates to the general field of education with overlapping areas wherein the educational means may be treated as a toy device. More specifically, the instant invention pertains to a visual instruction device.

One of the primary objects of this invention is to provide a device which may be operated through manual or electrical means to provide means for instantaneously and momentarily cutting off the line of vision of the wearer of the device when an incorrect response is given to a visual stimulus.

Another object of this invention is to provide vision-interrupting means to be worn on the head of the user and wherein shutter means are employed to momentarily interrupt the line of vision upon an erroneous vocal response by the user to a given visual stimulus.

A further object of this invention is to provide the wearer with a visual glimpse of certain subject matter after which the line of vision is closed and the user will, thereafter, be expected to give a correct definitive response to the visual stimulus.

This invention contemplates, as a still further object thereof, the provision of means of the type generally referred to supra, the means being non-complex in construction and assembly, inexpensive to manufacture and maintain, and which are durable in use.

Other and further objects and advantages of the instant invention will become more evident from a consideration of the following specification when read in conjunction with the annexed drawings, in which:

FIGURE 1 is a front elevational view of one embodiment of this invention illustrating the educational device or toy, FIGURE 1 showing the shutters in their respective open positions;

FIGURE 2 is a front elevational view similar to FIGURE 1, FIGURE 2 showing the shutters in their respective closed positions;

FIGURE 7 is a rear elevational view of the device or toy showing the shutters in their respective closed positions;

FIGURE 8 is a detail cross-sectional view of the device, FIGURE 8 being taken substantially on the vertical plane of line 8—8 of FIGURE 7, looking in the direction of the arrows;

FIGURE 9 is a perspective view of one of the shutters together with its operating lever; and FIGURE 10 is an exploded perspective view of the shutter carried means and of the mounting assembly for actuating the shutters.

Figure 3:
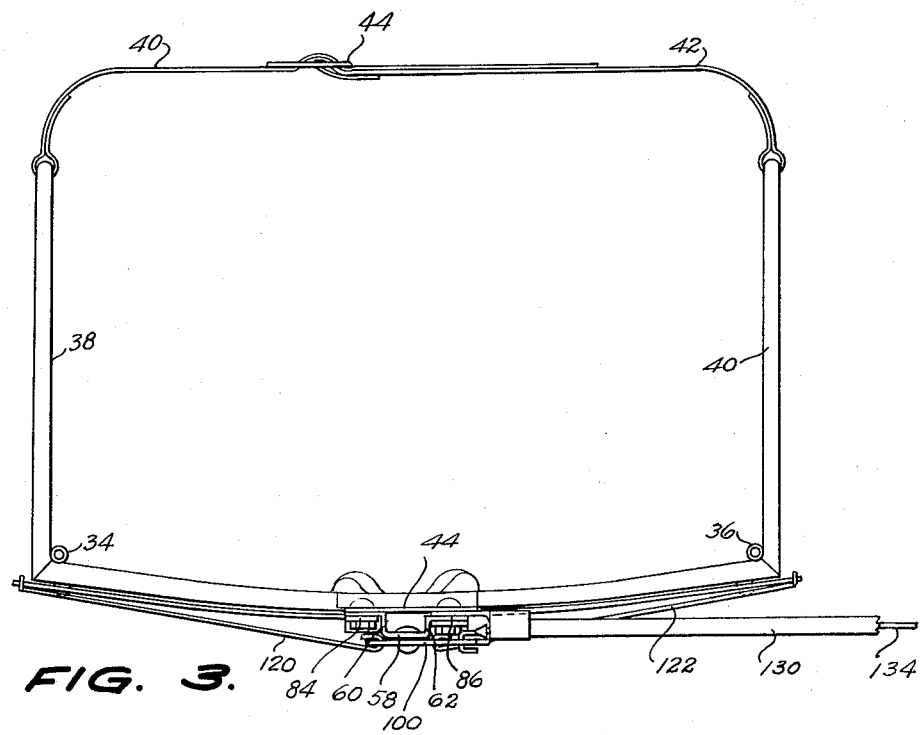
FIGURE 3 is a top plan view of the educational device or toy.
Figure 4:
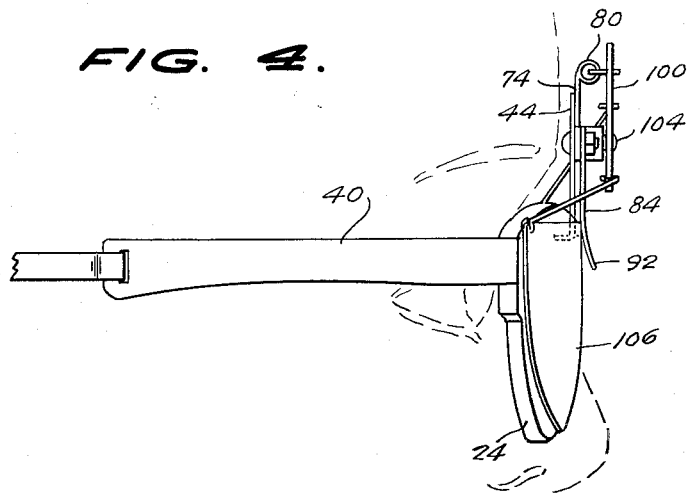
FIGURE 4 is a side elevational view of the educational device or toy.

Referring now more specifically to the drawings, and with particular reference to FIGURES 1 to 4, inclusive, reference numeral 20 designates, in general, an educational device or toy which is in the nature of an attention obtaining device constructed in accordance with the teachings of one of the embodiments of this invention. The device 20 is seen to comprise a conventional glasses frame 22 which includes lensless, substantially ovate right and left-hand open frames 24, 26 connected at their adjacent smaller ends by means of the usual nose bridge 28. The remotely-disposed upper edges of the frames 24, 26 are provided with outwardly-diverging flanges 30, 32, respectively, to which are pivotally connected as at 34, 36 (see FIGURE 3) one of the ends of a pair of elongated substantially rectangular temple bars 38, 40 which are adapted to engage opposite sides of the wearer's head in the usual manner. It is not essential to the practice of this invention that the opposed ends of the temple bars overlie the ears of the user, for the outer ends of the temple bars 38, 40 are connected to one of the ends of a pair of elongated substantially rectangular bands formed of any desirable flexible and elastic material, 40, 42, respectively. The other ends of the bands 40, 42 are connected together through a conventional clip 44 for adjustment purposes. The bands 40, 42 are adapted to engage and span the back of the head of the user of the device 20, and to support and maintain the same on the user's nose with the open frames 24, 26 juxtaposed with respect to the line of vision of the eyes of the wearer.

Reference numeral 44 designates a vertically-elongated, substantially-rectangular support plate having a laterally-projecting, substantially-rectangular flange 46 extending from the lower end thereof. The flange 46 (see FIGURE 10) is formed with openings 48 which extend transversely therethrough and which receive conventional fastening elements 50 (see FIGURES 7 and 8) wherein to fixedly connect the flange 46, and consequently, the support plate 44, to the nose bridge 28. To serve a function to be described, the support plate 44 is provided with a pair of laterally-spaced, vertically-elongated slots 52.

Located forwardly of the support plate 44 is a pair of laterally-spaced substantially-parallel vertically-elongated rectangular shutter guide members 54.

Reference numeral 56 designates, in general, an elongated substantially U-shaped channel member having a substantially rectangular bight 58 from which project a pair of laterally-spaced substantially-parallel side walls 60, 62 (see FIGURE 10). The outer ends of the side walls 60, 62 terminate in outwardly diverging substantially-rectangular flanges 64, 66 which are imposed against the front face of the support plate 44. The flanges 64, 66 are each formed with an aperture 68, 70, respectively, extending transversely therethrough, and the bight 58 has a similar aperture 72 centrally thereof. As is seen in the several figures of the drawings, the apertures 68, 70 are adapted to be aligned with the slots 52.

Reference numeral 74 denotes a substantially rectangular bracket having a lower end slotted as at 76. It will be noted that the slot 76 normally extends perpendicular to the slots 52. In the shown construction, the bracket 74 is interposed between the support plate 44 and the flange 64 with the slot 76 in registry with the slots 52 and the aperture 68.

As is seen in the drawings, the upper end of the bracket 74 is formed with a forwardly-projecting substantially hollow cylindrical collar 80 which serves a function to be described.

Located forwardly of the flanges 64, 66 and imposed thereon is a pair of laterally-spaced and substantially-parallel vertically-elongated rectangular shutter guide members 82, 84, the shutter guide members 82, 84 being slotted with openings 86, 88, respectively, adjacent their upper ends. The openings 86, 88 are adapted for registry with the openings 68, 70. The lower ends of each of the shutter guides 82, 84 are bent forwardly, as at 90, 92, to serve a function to be described below. Nuts 96 and bolts or screws 98 are employed to secure the U-shaped channel member 56, the bracket 74 and the shutter guides 90, 92 to the support plate 44, the bolts extending through the aforementioned slots, and openings described as being in registry, one with the others.

Reference numeral 100 indicates one lever of the kinematic system designated, in general, by reference numeral 102. The lever 100 is pivotally connected on pin 104 adjacent the lower end thereof, the pivotal connection being made through the bight 58.

Reference numerals 106, 108 designate a pair of substantially trapezoidal shutters of identical construction, and hence, a description of one is the description of the other.

The shutter 108 is provided with a substantially arcuate edge 110 and is pivotally connected at a corner thereof to the flange 32 by a pivot pin 112. As is seen in the drawings, the base edge 114 of the shutter 108 remotely-disposed with respect to the pivot pin 112 is notched or cut out as at 116 to serve a function to be described.

Each of the shutters 106, 108, at the corners thereof, located adjacent the pivot pin 112, is pivotally connected at 118 to one of the end levers 120, 122. The levers 120, 122 form a part of the aforementioned kinematic system. Specifically, referring to FIGURE 1 of the drawings, it is seen that the other end of the lever 120 is pivotally connected at 124 with the lower end of the lever 100 at one side of the pivot pin 104, and the other end of the lever 122 is pivotally connected at 126 to the lever 100 on the other end of the pivot pin 104.

From the foregoing description it will now be seen that as the lever 100 is pivoted clockwise in the direction of the arrow, as shown in FIGURE 1, the levers 120, 122 will push against the shutters 106, 108, causing the shutter 106 to pivot about its pivot pin 112 in a counterclockwise direction, and the lever 122 will cause the shutter 108 to pivot about its pivot pin 112 in a clockwise direction. As this movement takes place, the shutters move across the frames 24, 26. Rotation of the lever 100 in a counterclockwise direction will cause the shutters to move away from the frames 24, 26.

Flexible manually-operable means are employed to effect operation of the lever 100. These means are of conventional construction and are designated generally by reference numeral 128. As is seen in the drawings, these means comprise an elongated substantially hollow tubular flexible conduit 130 having an end thereof fixedly secured within the collar 80. The other end of the conduit 130 terminates in a bell 132. Extending through the conduit 130 is an elongated flexible wire 134 having one of its ends pivotally connected at 136 with the lever 100. It will be noted in FIGURE 1 of the drawings that this pivotal connection is made between the pivotal connection 126 and the adjacent end of the lever 100. The other end of the flexible wire 134 is connected to a finger ring 138. Thus, any force exerted on the wire 134 to cause the same to be pushed or pulled will cause movement of the lever 100.

As the shutters 106, 108 are pivoted to their fully closed positions, the cut-outs 116 engage against the bent portions 90, 92 of the shutter guides 82, 84 and rest against the inner ends of the bent portions 90, 92. This serves to limit pivotal movement of the shutters 106, 108 in one direction.

FIGURES 5 to 8, inclusive, illustrate a second embodiment of this invention wherein elements thereof having counterparts in the first embodiment are identified by identical reference numerals. The only departure between this embodiment of the invention and the first described and illustrated resides in the substitution of electrically controlled means for actuating the kinematic system in place of the manually operable means described above.

Thus, as seen in these figures, the case 200 of an electromagnet 202 is welded or otherwise fixedly secured to the bracket 74. The electromagnet 202 is provided with the usual reciprocating armature 206 having a reduced end 208 which is pivotally connected onto the pin 210 to the upper end of the lever 100. As is clearly seen in FIGURE 6, the armature 206, adjacent its reduced end 208 is formed with a flange 212, and interposed between the flange 212 and adjacent end of the case 200 and surrounding the armature 206 is a helicoidal spring 214 under compression. It is thus seen that the armature 206 is biased constantly for movement away from the case 200.

Wires 216, 218 connect the electromagnet 202 in series with the conventional battery 220 and a manually operable push-button switch 222 having a thumb-operated push-button 224 are normally biased for outward movement to maintain the series circuit open or de-energized. The switch 222 is conventional in all respects.

Figure 5:
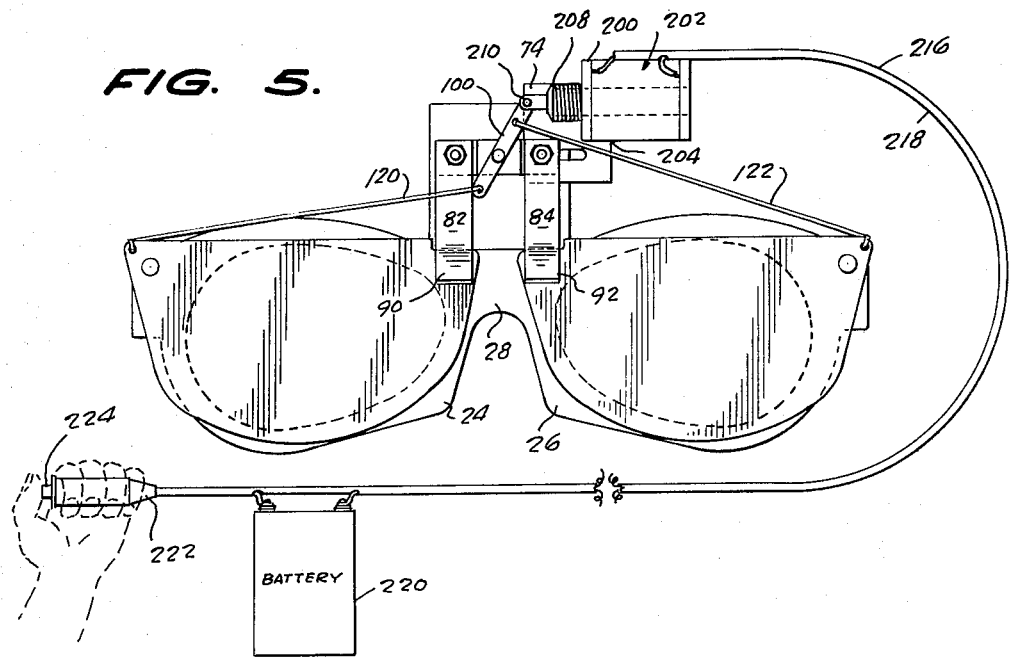
FIGURE 5 is a front elevational view of the device or toy and illustrates a second embodiment of this invention, the shutters thereof being shown in their closed positions.
Figure 6:
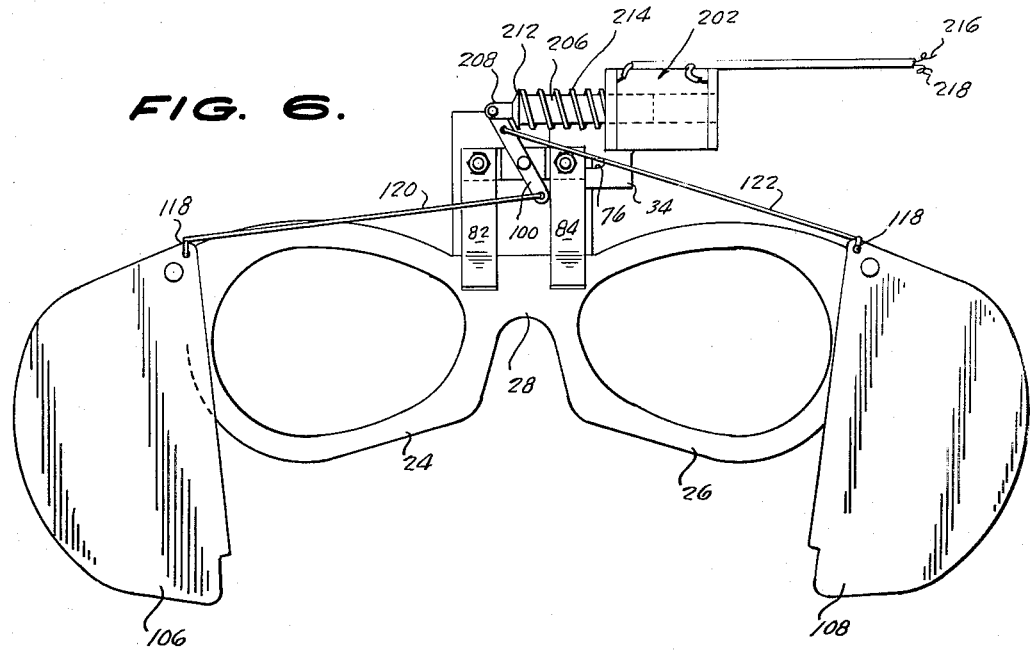
FIGURE 6 is a front elevational view of the device or toy, similar to FIGURE 5, but showing the shutters in their open positions.

When the switch 222 is in its open position, the bias of the spring 214 moves the shutters 106, 108 to their respective open positions as is seen in FIGURE 6. However, upon the closing of the switch 222 and the energization of the electromagnet 202, the armature 206 is retracted against the tension exercised by the helicoidal spring 214 whereby the shutters 106, 108 move to their respective closed positions as is shown in FIGURE 5.

The device 20 is adjustable to fit substantially any of the conventional eyeglass frames. Since these frames vary in size, the throw of the lever 100 must be controlled. Thus, the bracket 74 may be adjusted toward and away from the pivot pin 104 through the loosening of the nut 96 to permit the screw 98 to be adjustably received within the slot 76. As soon as this adjustment is completed, the nut 96 is again tightened on its associated screw or bolt 98.

The throw of the shutters 106, 108 will also vary depending upon the size of the eyeglass frame. To this end, the screws 98 are slidable within the slots 52 whereby the shutter guides may be vertically-adjusted relative to the frames 24, 26.

The above-described device has been developed from long periods of observation by teachers who work directly with children having problems in reading, such as, for example, word omissions, word substitutions, mispronunciations and other errors. Many experienced teachers have concluded that a high percentage of these errors occur because certain pupils have tendency to be over-dependent upon teacher-direction and teacher-help. The pupils are, therefore, less independent and responsible for first responses to a visual stimulus, making it necessary for the teacher to vocally intercede with the child to reconsider his first incorrect response.

It has also been ascertained that a great many children do not devote their full attention and concentrated powers to a response situation due to the protective custody of the teacher. It is to correct these difficulties that the instant device has been devised.

These instructural situations, if prolonged, are of danger to the pupil, for erroneous responses by pupils in any area of learning, if permitted to continue, will tend to destroy a child's confidence and self esteem, and in fact, may become fixations which may be corrected only through long periods of specialized clinical work. Short periods of work with the instant device shows that a child or pupil becomes cautious in his responses and probes more diligently for accurate responses.

In a sense, the instant device constitutes a challenge to the wearer, causing him to be more alert and less prone to make careless mistakes which, in turn, tends to build understanding and confidence in the child.

While the device under consideration has been described generally in the field of education, it has found ready adaptation for children in many game-like situations.

Having described and illustrated two embodiments of this invention, it should be understood that the same are offered merely for the purposes of example, and that this invention is to be limited only by the scope of the appended claims.

What is claimed is:

1. An educational device comprising an eyeglasses frame, means for supporting the eyeglasses frame on the head of the user, said eyeglasses frame including an open frame for each eye, a nose bridge connecting adjacent ends of said open frames, a shutter for each of said open frames, means pivotally connecting said shutters on their respective open frames adjacent the remotely-disposed ends of said open frames for movement across and away from said open frames, a support plate mounted on said nose bridge, a first lever pivotally connected intermediate its ends on said support plate, second levers pivotally connecting with each end, respectively, of said first lever and with, respectively, one of said shutters, and means connected with said first lever to effect pivotal movement thereof and consequently of said shutters.

2. An educational device as defined in claim 1 wherein said last-named means comprise push-rod means.

3. An educational device as defined in claim 1 wherein said last-named means is electromagnetic means.

4. An educational device comprising an eyeglasses frame, means for supporting said eyeglasses frame on the head of the user, said eyeglasses frame including an open frame for each eye, a nose bridge connecting adjacent ends of said open frames, a shutter for each of said open frames, means pivotally connecting said shutters on their respective open frames adjacent the remotely-disposed ends of the latter whereby said shutters may be pivoted thereacross or away therefrom, a support plate fixedly secured to said nose bridge and projecting away therefrom, a substantially U-shaped channel member fixedly secured to said support plate with the bight thereof laterally spaced from a side of said support plate, a first lever pivotally connected intermediate its ends on said bight, second levers having a pair of adjacent ends pivotally connected, respectively, with the remotely-disposed ends of said first lever, the other ends of said second levers being pivotally connected with said shutters, respectively, adjacent their remotely-disposed sides, and means on said support plate and connected with said first lever to effect pivotal movement thereof and consequently of said shutters.

5. An educational device as defined in claim 4 wherein said last-named means comprises a substantially hollow collar fixedly secured to said support plate, an elongated substantially hollow tubular and flexible conduit having an end thereof fixedly secured within said collar, and an elongated flexible push rod extending through said hollow tubular conduit and having an end thereof pivotally connected with said first lever adjacent an end thereof, and handle means at the opposed end of said push rod.

6. An educational device as defined in claim 5 and a shutter guide for each of said open frames, said shutter guides having one of their respective ends fixedly secured to said support plate and depending therefrom with their respective other ends disposed in the path of movement of said shutters.

7. An educational device as defined in claim 4 wherein said last-named means is an electromagnet having a reciprocable armature and means for supporting said electromagnet on said support plate, said means including a substantially rectangular bracket fixedly secured to said support plate and projecting laterally from a side thereof, means fixedly securing said electromagnet to said bracket, means fixedly connecting one end of said armature with said first lever means, and an electric circuit for energizing said electromagnet at preselected intervals.

8. An educational device as defined in claim 7, and resilient means constantly tending to urge said armature toward its extended outer position to open said shutters when said electromagnet is de-energized.

References Cited by the Examiner

UNITED STATES PATENTS

| | | | |
|---|---|---|---|
| 327,438 | 9/1885 | Fuller | 2—15 |
| 562,071 | 6/1896 | De Moulin | 2—15 |
| 2,397,009 | 3/1946 | Hurley et al. | 2—14 |
| 2,789,462 | 4/1957 | Forgrave | 2—14.9 X |

JORDAN FRANKLIN, *Primary Examiner.*